United States Patent [19]

Otobe et al.

[11] Patent Number: 4,788,954

[45] Date of Patent: Dec. 6, 1988

[54] METHOD FOR CONTROLLING BY-PASS AIR FLOW ON DECELERATION OF INTERNAL COMBUSTION ENGINE

[75] Inventors: Yutaka Otobe; Sachito Fujimoto; Akira Katoh, all of Saitama, Japan

[73] Assignee: Honda Giken Kogyo Kabushiki Kaisha, Tokyo, Japan

[21] Appl. No.: 71,780

[22] Filed: Jul. 10, 1987

[30] Foreign Application Priority Data

Jul. 10, 1986 [JP] Japan .................... 61-162812

[51] Int. Cl.⁴ ............................ F02M 23/06
[52] U.S. Cl. ........................ 123/327; 123/585
[58] Field of Search ............. 123/327, 339, 493, 585

[56] References Cited

U.S. PATENT DOCUMENTS

| | | | |
|---|---|---|---|
| 4,430,973 | 2/1984 | Miyagi | 123/585 X |
| 4,453,514 | 6/1984 | Martinsons et al. | 123/327 |
| 4,492,211 | 1/1985 | Shimomura et al. | 123/585 |
| 4,700,679 | 10/1987 | Otobe et al. | 123/585 X |

FOREIGN PATENT DOCUMENTS

| | | |
|---|---|---|
| 1410 | 1/1980 Japan | 123/327 |
| 176441 | 10/1983 Japan | 123/327 |

*Primary Examiner*—Tony M. Argenbright
*Attorney, Agent, or Firm*—Lyon & Lyon

[57] ABSTRACT

Described herein is a method for controlling the bypass air flow of internal combustion engine, which prevents the air-fuel ratio from becoming over rich temporarily in the initial stage of deceleration of the engine by driving a control valve to open a throttle by-pass passage on deceleration of the engine to supply auxiliary air thereto and which includes: detecting the open angle of the throttle valve; setting a valve opening rate according to the throttle open angle; setting an upper limit on the valve opening rate when it is greater than an upper limit value determined in relation with the engine speed; driving the control valve according to the valve opening rate; and on deceleration of the engine, gradually reducing a valve opening rate set in an operation prior to the deceleration.

1 Claim, 4 Drawing Sheets

METHOD FOR CONTROLLING BY-PASS AIR FLOW ON DECELERATION OF INTERNAL COMBUSTION ENGINE

BACKGROUND OF THE INVENTION

1. Field of the Invention

This invention relates to a method for controlling the by-pass air flow on deceleration of internal combustion engines, and more particularly to a method for controlling the by-pass air flow to prevent temporary over-enrichment of the air-fuel ratio in an initial stage of deceleration.

2. Description of the Prior Art

For preventing the air-fuel ratio from becoming overich on deceleration of an internal combustion engine, there has been known an apparatus (of the so-called dashpot) which employs a vacuum diaphragm thereby to stop the throttle valve once in an open position of a certain angle and then close same gradually to the fully closed position to prevent a sudden shutoff of the throttle valve.

With the above-mentioned apparatus, the throttle valve is slowly moved into the fully closed position from the predetermined open angle position, but the throttle opening is abruptly reduced from a wide-open position until the predetermined open angle position is reached. Accordingly, when the throttle is returned under a high engine speed condition, the torque difference is increased by the abrupt reduction of the throttle valve opening, causing a shock in the initial stage of deceleration and over-enriching the air-fuel ratio due to an abrupt drop of the absolute pressure in the intake pipe downstream of the throttle valve.

The characteristics of the above-mentioned dashpot are shown in FIG. 6, a correlation diagram of the number of engine revolutions Ne versus the intake pipe absolute pressure PBA, in which unloaded characteristics of the engine are indicated by the rightwarly rising curve I. Especially, the point Q at the terminal end of this characteristics curve I indicates the idling condition. The engine characteristics under the fully closed throttle condition (idling throttle opening) are indicated by the hyperbola II, while the engine characteristics under the conditions where the throttle valve is in the predetermined open angle position of the aforementioned dashpot are indicated by the curve III (one-dot chain line). Namely, when the accelerator pedal is depressed and then released, the conventional dashpot operates to drop the intake pipe absolute pressure onto the curve III from a point above the curve I indicative of an engine speed Ne higher than the idling speed and then gradually to the fully closed throttle curve II toward the point Q. However, since there is a large difference in the intake pipe absolute pressure PBA between the curves I and III at high engine speeds as indicated by a broken line, the air-fuel ratio tends to become overich in most cases, causing a large variation in torque in the initial stage of deceleration.

SUMMARY OF THE INVENTION

With the foregoing situations in view, the present invention has as its object the provision of a method for controlling the by-pass air flow on deceleration of internal combustion engines, which can prevent over-enrichment of the air-fuel ratio at the time of deceleration from a high engine speed condition, suppressing the shock which would otherwise occur in the initial stage of the deceleration.

In accordance with the present invention, the foregoing object is achieved by the provision of a method of controlling the by-pass air flow on deceleration of an internal combustion engine by driving a control valve to open a throttle by-pass passage of the internal combustion engine on deceleration for supplying auxiliary air thereto, the method comprising; detecting the open angle of the throttle valve; determining the valve opening rate for the control valve according to the detected throttle open angle; setting an upper limit on the valve opening rate when in excess of a predetermined upper limit determined in relation with the engine speed; driving the control valve according to the valve opening rate; and on deceleration of the engine, gradually reducing a valve opening rate set in an operation prior to the deceleration.

The above and other objects, features and advantages of the invention will become apparent from the following description and the appended claims, taken in conjunction with the accompanying drawings which show by way of example a preferred embodiment of the invention.

DESCRIPTION OF PREFERRED EMBODIMENTS

Figure 1:
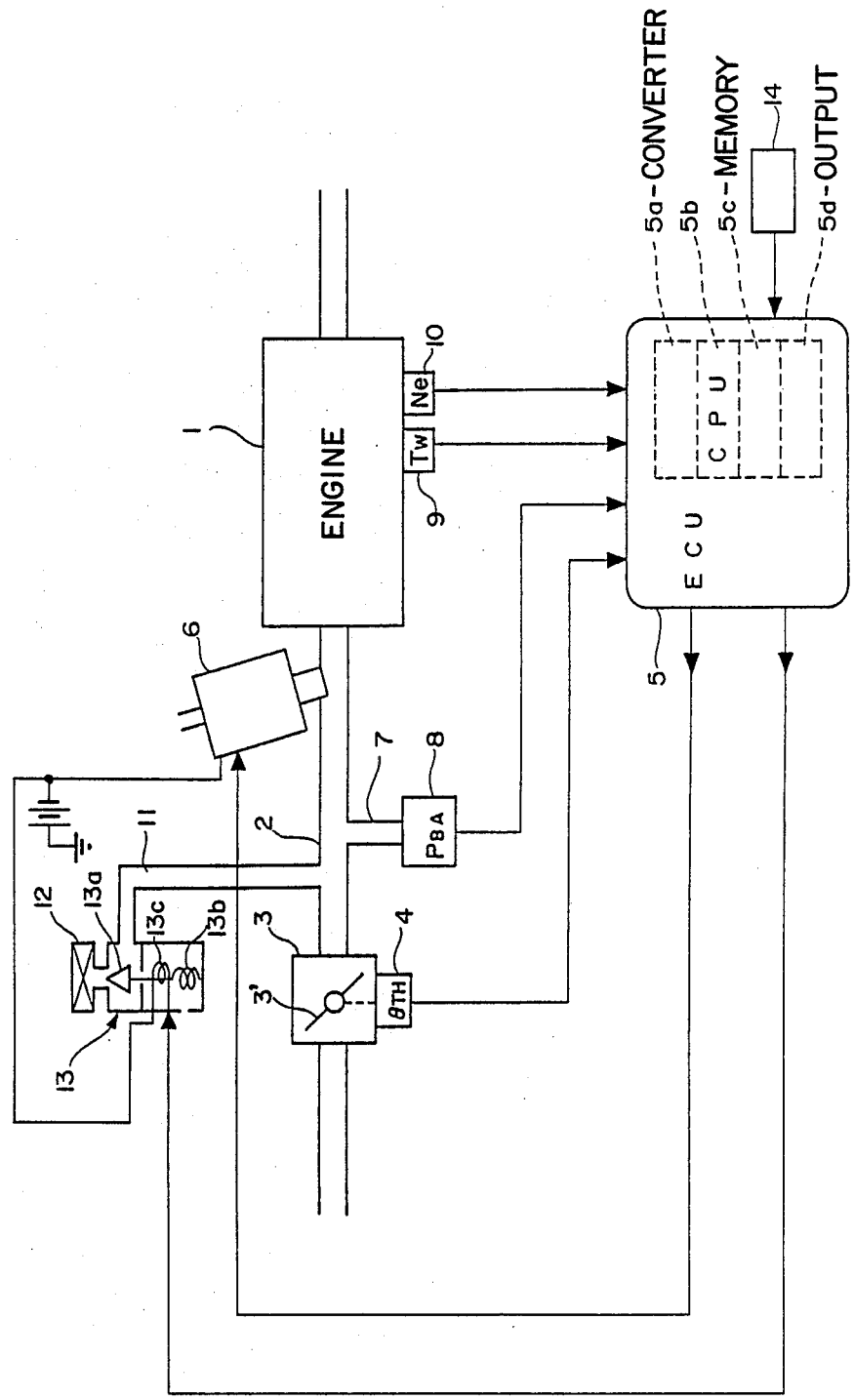
FIG. 1 is a digrammatic illustration showing the general configuration of a fuel supply control system for internal combustion engine, incorporating the method of the invention.

Now, the invention is described more particularly by way of a preferred embodiment shown in the drawings.

Referring to FIG. 1, there is shown the general configuration of a fuel supply control system incorporating the method of the invention, wherein indicated at 1 is, for example, a 4-cylinder internal combustion engine which has an intake pipe 2 connected thereto. Located in the middle of the intake pipe 2 is a throttle casing 3 which is internally provided with a throttle valve 3'. A throttle open angle ($\theta$TH) sensor 4 is associated with the throttle valve 3' to convert the open angle of the throttle valve 3' into an electric signal which is supplied to an electronic control unit (hereinafter referred to as "ECU" for brevity).

For each cylinder of the engine, a fuel injection valve 6 is provided in the intake pipe at a position between the engine 1 and throttle casing 3 and a little upstream of the intake valve (not shown) of the corresponding cylinder. Each one of the fuel injection valves 6 are connected to a fuel pump, not shown, and at the same time electrically connected to ECU 5 which produces signals for controlling the valve open time of the fuel injection valves 6.

Located between the fuel injection valves 6 and throttle casing 3 in the intake pipe 2 is an air passage 11 which communicates the intake pipe 2 with the atmosphere. An air cleaner 12 is attached to the outer open end of the air passage 11 which opens to the atmosphere, and an auxiliary air control valve 13 is inserted in the air passage 11. This auxiliary air control valve 13 is of a normally closed type, and includes a valve body 13a which is capable of continuously varying the open area of the air passage 11, a spring 13b for biasing the valve body 13a in a valve closing direction, and an electromagnetic solenoid 13c for moving the valve body 13a in a valve opening direction against the biasing force of the spring 13b. The current to be supplied to the solenoid 13c of this proportional electromagnetic valve 13 is controlled by ECU 5 to establish an open area which is determined according to the engine operating condition and load condition.

An absolute pressure (PBA) sensor 8 is communicated with the intake pipe through a pipe 7 at a position downstream of the throttle valve 3' in the throttle casing 3, thereby to convert the absolute pressure into an electric signal for supply to ECU 5.

Mounted on the engine body 1 is an engine cooling water temperature sensor 9 (hereinafter referred to as "Tw sensor" for brevity) which is constituted by a thermistor or the like and mounted in the circumferential wall of the engine cylinders to detect the engine cooling water temperature and supply an electric signal of the detected temperature to ECU 5. An engine speed sensor 10 (hereinafter referred to as "Ne sensor") is mounted on the circumference of the camshaft or crankshaft which is not shown, and adapted to produce a crank angle position signal (hereinafter referred to as "TDC signal") on every 180° revolution of the engine crankshaft at predetermined crank angle positions, namely, at positions anterior by a predetermined angle to the top dead center (TDC) where the respective cylinders commence the intake stroke. This TDC signal is similarly fed to ECU 5.

Further, a sensor 14 for other parameters such as vehicle speed or atmospheric pressure is connected to ECU 5 to supply thereto a signal of the detected value.

ECU 5 includes an input circuit 5a with functions of shaping input signal waveforms, correcting levels of input signals and converting analog signals into digital signals, a central processing unit 5b (hereinafter referred to as "CPU"), memory means 5c for storing various arithmetic programs to be executed by CPU 5b and the results of arithmetic operations, and an output circuit 5d for supplying drive signals to the fuel injection valves 6.

On receipt of each TDC signal, CPU 5b computes the fuel injection time Tout of the corresponding fuel injection valve 6, as expressed by the equation given below, on the basis of the engine parameter signals which are received through the input circuit 5a.

$$TouT = Ti \times K1 \times K2 \quad (1)$$

where Ti is a standard value of fuel injection time for the fuel injection valve 6 and determined on the basis of the engine speed Ne and the intake pipe absolute pressure PBA. K1 and K2 are a correction coefficient and a correction variant, respectively, which are determined according to predetermined operation formulas on the basis of the engine parameter signals from the respective sensors in such a manner as to establish the optimum qualities in various characteristics depending on the engine operating conditions, for example, in starting characteristics, exhaust gas characteristics, fuel mileage characteristics, acceleration characteristics and the like.

Based on the fuel injection time TouT which is determined in the above-described manner, CPU 5b sends out a drive signal to the fuel injection valve 6 through the output circuit 5d to open the valve accordingly.

Further, upon receipt of a timer interrupt signal which is produced at predetermined time intervals, CPU 5b supplies the battery current to the solenoid 13c of the auxiliary air control valve 13 according to the engine parameter signals which are received from the various sensors through the input circuit 5a.

Figure 2:
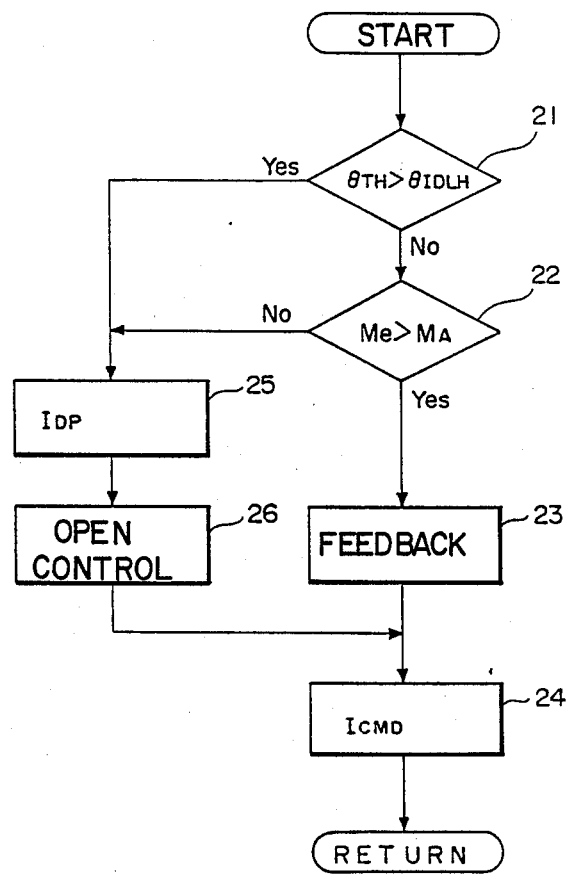
FIG. 2 is a flowchart of a main routine of a program for controlling an auxiliary air flow control valve.

Shown in FIG. 2 is a flowchart of a control program (main routine) for the auxiliary air control valve, which is executed at predetermined time intervals by timer interruption.

Firstly in Step 21, whether or not the detected open angle $\theta TH$ of the throttle valve is greater than a predetermined angle $\theta IDLH$ which is slightly greater than the idling open angle $\theta IDLL$. If the answer is negative (no), a check is made in next Step 22 as to whether or not the interval Me of the crank angle signals is greater than a predetermined cycle MA, namely, whether or not the engine speed Ne is approximately lower than the idling speed. In case the answer in Step 21 is negative (no) and the answer in Step 22 is affirmative (yes), the engine is in an idling condition and therefore the control of the auxiliary air control valve is put in a feedback (F.B.) control mode operating on the engine speed Ne (Step 23), producing a valve open drive signal ICMD (duty ratio control signal) of this mode for the control valve (Step 24) at the end of the present program.

Figure 3:
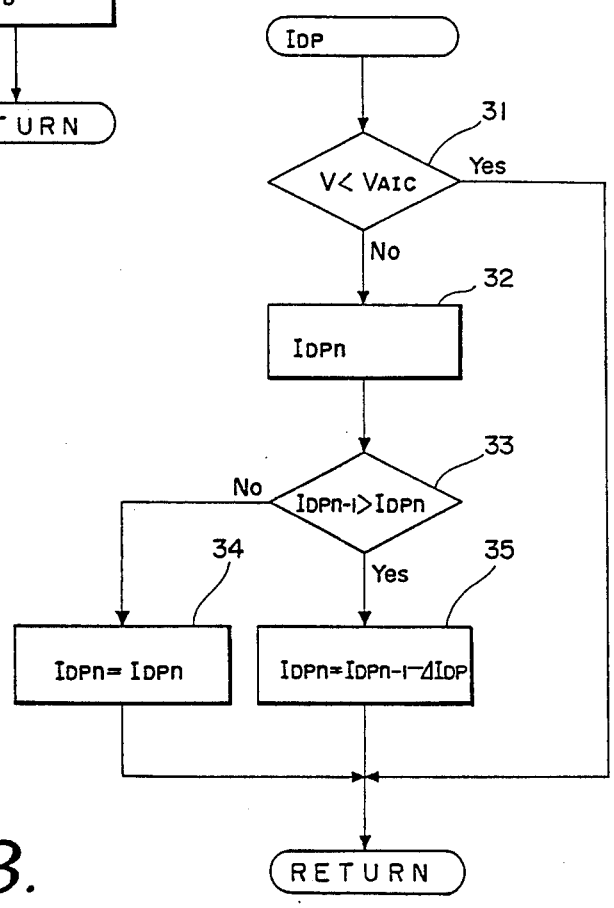
FIG. 3 is a flowchart of a subroutine which is executed in Step 25 of FIG. 2.

If the answer in Step 21 is affirmative (yes) or if the answer in Step 22 is negative (no), the engine is not in the idling state and therefore the subroutine of FIG. 3, which will be described hereinlater, is executed to compute the valve opening duty ratio IDP for the auxiliary air control valve (Step 25), and the control of the auxiliary air control valve is put in an open control mode (Step 26), producing a valve opening drive signal ICMD of this mode for the control valve (Step 24) at the end of the present program.

Now, the steps of the subroutine for computing the valve opening duty ratio IDP for the auxiliary air control valve are explained with reference to FIG. 3. It is this subroutine that executes the method of controlling the bypass air flow on deceleration according to the invention to prevent over-enrichment of the air-fuel ratio on deceleration and to suppress the shock in the initial stage of the deceleration.

Firstly, whether or not the detected vehicle speed V is lower than a certain vehicle speed VAIC (e.g. 10 km/h) is checked out in Step 31. In case the answer is affirmative (yes), the present program is ended immediately. This is because there is no possibility of an abrupt deceleration if the vehicle is already operating in a low speed condition which does not require measures for preventing over-enrichment and deceleration shock.

Figure 4:
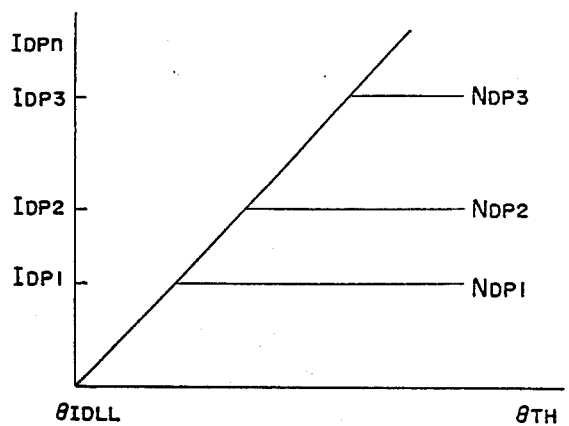
FIG. 4 is a correlation diagram between the throttle open angle $\theta$TH and valve opening duty ratio IDpn.
Figure 5:
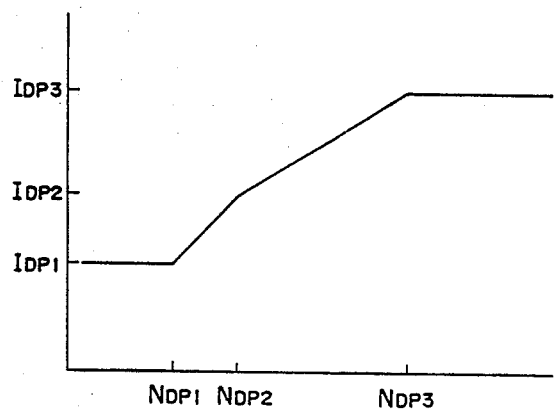
FIG. 5 is a correlation diagram between the engine speed Ne and upper limit of the valve opening duty ratio.

In case the judgement in Step 31 is negative (no), the valve opening duty ratio IDpn (a value for calculation) for the auxiliary air control valve of the current loop is computed in Step 32, according to the procedures of computation as explained below. Firstly, when the engine speed Ne is lower than a predetermined value NDP1 (e.g. 1000 rpm), an upper limit of IDp1 (e.g. 10%) is put on the value of the valve opening duty ratio IDpn (see FIG. 5). Nextly, a valve opening duty ratio IDpn proportional to the throttle valve open angle $\theta$TH is computed (see FIG. 4). In this case, however, the value IDpn is set at a value smaller than IDp1. In addition, when the engine speed Ne is greater than a predetermined value NOp1 and smaller than another predetermined valve NDp2 (e.g. 3000 rpm), the upper limit of the valve opening duty ratio IDpn is set at a value between IDp1 and IDp2 (e.g. 40%). This value is determined by proportional distribution relative to the engine speed Ne (cf. FIG. 5). Then, a valve opening duty ratio IDpn proportional to the throttle open angle $\theta$TH is determined. In this case, IDpn is set at a value between IDp1 and IDp2 and smaller than the upper limit (cf. FIG. 4). Further, when the engine speed Ne is greater than the predetermined value NDp2 and smaller than a predetermined value NDp3 (e.g. 7000 rpm), the upper limit of the valve opening duty ratio IDpn is determined by proportional distribution relative to the engine speed Ne at a value between IDp2 and IDp3 (e.g. 50%). In case the engine speed Ne is greater than the predetermined value NDp3, the upper limit of the valve opening duty ratio IDpn is set at IDp3 (cf. FIG. 3). In these cases, IDpn is set at a value between IDp2 and IDp3 and smaller than the upper limit (cf. FIG. 4). In this manner, the valve opening duty ratio IDpn is set at a value which is commensurate with the throttle open angle $\theta$TH but limited by the engine speed Ne.

In next Step 33, it is determined whether or not the value of IDpn of the current loop computed in Step 32 is less than the value of IDpn-1 computed in Step 32 in the preceding loop. If the answer to this is negative (no), the value of IDpn of the current loop is established as a valve opening duty ratio IDpn (an actual value) in case the main routine of FIG. 2 is in open mode (Step 34), then ending the present program. Consequently, the auxiliary air control valve is controlled according to the throttle open angle $\theta$TH and the engine speed Ne.

On the other hand, in case the result of judgement in Step 33 is affirmative (yes), a value which is obtained by subtracting a predetermined value $\Delta$IDp (e.g. 10%) from the value IDpn-1 of the previous loop is established as a valve opening duty ratio IDpn when in open mode (Step 35), then ending the present program. As a result, when the calculated value of the valve opening duty ratio IDpn is minimized by a reduction of the throttle open angle $\theta$TH, the control rate for the auxiliary air control valve is gradually reduced. When the result of judgement in Step 33 is negative (no), the valve opening duty ratio IDpn is set at a predetermined value IDpn.

The following description illustrates how the auxiliary air control valve 13 is controlled by the method of FIGS. 2 through 5 in various operating conditions of the vehicle.

Figure 7:
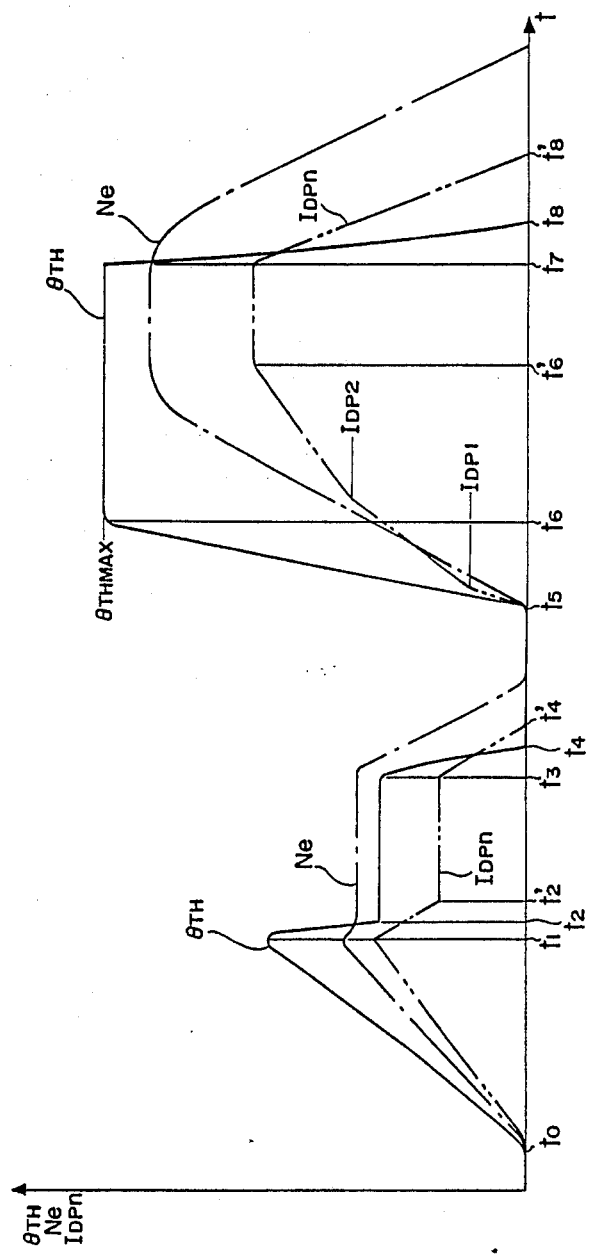
FIG. 7 is a diagram showing sequential variations in engine speed Ne and valve open duty ratio Idpn responsive to variations in throttle open angle $\theta$TH.

The left-hand half of FIG. 7 shows variations in the engine speed Ne by one-dot chain line and variations in the valve opening duty ratio IDpn of the auxiliary air control valve 13 indicated by two-dot chain line in different operating conditions of the vehicle where the throttle open angle $\theta$TH is varied as indicated by solid line for a slow accelerating operation (between time points t0 and t1 where the throttle valve is opened slowly, increasing the engine speed accordingly), a cruising (constant speed) operation (t2 to t3) and a decelerating operation (t3 to t4). In the slow acceleration, the value of the valve opening duty ratio IDpn is varied in proportion to the throttle open angle $\theta$TH (t0 to t1) according to the relationship shown in FIG. 4. When the throttle valve is returned halfway after completion of the acceleration to put the vehicle in the cruising operation with a constant throttle open angle $\theta$TH, the valve opening duty ratio IDpn is reduced at a certain rate irrespective of the throttle open angle $\theta$TH and maintained at a constant value (t2' to t3) after the time point t2' when it is reduced to a value corresponding to the throttle open angle $\theta$TH between the time points t2 and t3 in the relationship of FIG. 4. Even if the throttle open angle $\theta$TH is reduced to the fully closed position abruptly (t3 to t4) by returning the accelerator pedal after the cruising operation, the valve opening duty ratio IDpn is reduced at a predetermined rate over a certain time period irrespective of the throttle open angle until it reaches IDpn=0 at the time point t4' with a delay from the time point t4 when the throttle valve is fully closed. The engine speed Ne is dropped to the idling speed with a further delay to suppress the shock in the initial stage of deceleration.

The right-hand half of FIG. 7 shows variations in the engine speed Ne by one-dot chain line and variations in the valve opening duty ratio IDpn of the auxiliary air control valve 13 by two-dot chain line in different operating conditions of the vehicle where the throttle open angle $\theta$TH is varied as indicated by solid line for a quick accelerating operation (between time points t5 to t7 where the throttle valve is fully opened instantly and the engine speed Ne is increased with a delay) and a decelerating operation (t7 to t8). When the accelerator pedal is depressed quickly to the fully open position (time point t6), the engine speed Ne is still halfway of its rising curve, so that the valve opening duty ratio IDpn becomes equal to an upper limit value of FIG. 5 which corresponds to the engine speed Ne. Namely, the value of IDpn is increased immediately up to IDp1, but thereafter it is increased with increases of the engine speed Ne (t5 to t6') through IDp2 according to the relationship of FIG. 5. Then, as the increase of the engine speed Ne stops, it is maintained at an upper limit value which corresponds to the engine speed Ne (t6' to t7). Even if the throttle opening angle $\theta$TH is abruptly reduced to the fully closed position by quickly returning the accelerator pedal (t7 to t8), the valve opening duty ratio IDpn is reduced at a predetermined rate over a certain time period until it becomes IDpn=0 (at t8') with a delay from the time point t8 when the throttle valve is completely closed. Consequently, also in case of a deceleration after a quick acceleration, the shock in the initial stage of the deceleration is suppressed.

Figure 6:
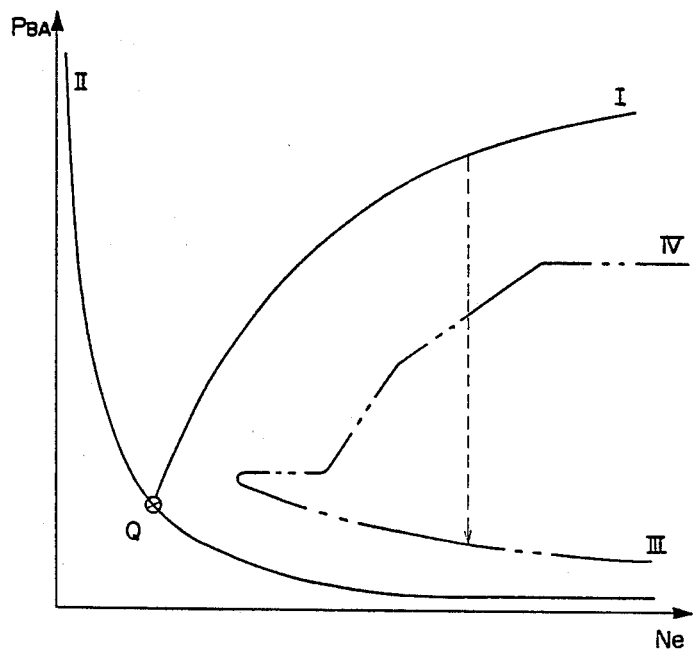
FIG. 6 is a diagram of engine characteristics in relation to the engine speed Ne and intake pipe absolute pressure PB.

In the foregoing operating conditions, the auxiliary air control valve 13 is opened at a certain valve opening duty ratio when the throttle valve is completely closed after deceleration (t4 or t8), so that the intake pipe absolute pressure PBA becomes greater than in a normal throttle closed condition, shifting the engine characteristics to the upper side of the engine characteristics curve II in normal throttle closed condition as shown in FIG. 6. In this figure, the two-dot chain line IV indicates the engine characteristics in a case where, for example, the valve opening duty ratio of the auxiliary air control valve 13 is increased according to the relationship of FIG. 5 while holding the throttle valve in the fully closed position. The valve opening duty ratio IDpn which effects the engine characteristics is set not after commencement of a decelerating operation but during an acceleration as shown in the right-hand (or left-hand) half of FIG. 7, already supplying auxiliary air when starting a deceleration. Therefore, although a greater throttle open angle $\theta$TH which means a greater load normally causes a greater shock in the initial stage of deceleration if the throttle valve is closed abruptly, the method of the invention lessens the deceleration shock by securing an auxiliary air flow of IDpn according to the throttle open angle $\theta$TH already at a time point of starting deceleration and gradually reducing the auxiliary air flow. Especially, in case of a deceleration after a quick acceleration as shown in the right-hand portion of FIG. 7, the engine characteristics remain on the two-dot chain line IV of FIG. 6 for some time, and then the opening of the auxiliary air control valve is gradually reduced, lessening the deceleration shock to a marked degree as compared with the conventional dashpot (which produces the engine characteristics of one-dot chain line III in the same figure).

As clear from the foregoing description, the present invention concerns a method for controlling the by-pass air flow on deceleration of an internal combustion engine by driving a control valve to open a throttle by-pass passage of the engine to supply auxiliary air at the time of deceleration, which is characterized by: detecting the throttle valve open angle; setting a valve opening rate of the control valve according to the throttle open angle; setting an upper limit on the valve opening rate when it is greater than an upper limit value determined in relation with the engine speed; driving the control valve to open the throttle by-pass passage according to the valve opening rate; and on deceleration of the internal combustion engine, gradually reducing the valve opening rate established prior to the deceleration, thereby effectively preventing over-enrichment of the airfuel ratio and lessening the shock in the initial stage of deceleration even when the engine is decelerated from a high speed.

What is claimed is:

1. A method for controlling the by-pass air flow on deceleration of an internal combustion engine by driving a control valve to open a throttle by-pass passage to supply auxiliary air to the engine, said method comprising:

detecting the throttle open angle;

setting a valve opening rate of said control valve according to said throttle open angle;

setting an upper limit on said valve opening rate when said valve opening rate as determined by the throttle open angle is greater than an upper limit value determined in relation with the engine speed;

driving said control valve to open said throttle by-pass passage according to said valve opening rate; and upon deceleration of said internal combustion engine, gradually reducing the valve opening rate established prior to said deceleration.

* * * * *